Feb. 10, 1948.  C. A. MABEY  2,435,632
WET BULB FOR HYGROMETRIC MEASUREMENT
Filed May 8, 1944

INVENTOR.
CHARLES A. MABEY
BY
ATTORNEY

Patented Feb. 10, 1948

2,435,632

UNITED STATES PATENT OFFICE 2,435,632

WET BULB FOR HYGROMETRIC MEASUREMENT

Charles A. Mabey, Woodbury, Conn., assignor to The Bristol Company, Waterbury, Conn., a corporation of Connecticut Application May 8, 1944, Serial No. 534,541

8 Claims. (Cl. 297—2)

This invention relates to the determination of the moisture content, or humidity, of a gaseous medium, and more especially to a form of temperature-sensitive bulb suitable for such measurement. In the determination of the amount of condensible vapor in a mixture of gases or vapors, or, more specifically, in the measurement of moisture content of air, as in the art of air conditioning, etc., it is common practice to make use of the device known as the psychrometer, or "wet-and-dry-bulb" hygrometer.

In industrial practice, for purposes of recording or automatic control, or both in combination, such a wet and dry bulb instrument consists of two thermometer systems (with or without attendant controlling mechanisms) having independent bulb systems, one of which is exposed, without covering, to a moving stream of air whose moisture content, or humidity, is to be measured; the other is exposed likewise, but is by some means kept covered with a film of water, the evaporation of which produces a lowering of the temperature of this "wet" bulb, and, under conditions of thermodynamic equilibrium, results in a temperature indication which may be combined with that of the "dry" bulb to provide a measure expressible in terms of the relative humidity, or the moisture content, of the air stream.

The theory of this method of hygrometry is well known and may be found fully explained in many textbooks on physics, or, for example, in Report No. 237 of the United States Weather Bureau. A more exhaustive study of the basic principles of the method may be found by reference to the following two papers: (1) D. Dropkin: "Effect of air velocity on wet-bulb thermometers," Cornell University Experimental Station Bulletin No. 23, 1936 (45 pp.). (2) J. H. Arnold: "Theory of psychrometer," Contribution of M. I. T. Department of Chemical Engineering No. 308.

In hygrometric instruments of this class as at present constructed, the "wet bulb" thereof comprises a hollow cylindrical container, formed of copper or other metal, preferably having a high thermal conductivity, filled with a temperature-sensitive fluid, or an electrical resistance element, and having a film of water maintained on its exterior surface by either of two methods: There may be wrapped snugly around the outside surface of the bulb a thin wick formed of cloth or other capillary fabric and having a free end left hanging into a pan of water. Some of this water is drawn upward by capillary action, saturating the wick and thereby providing a film which is constantly replenished during evaporation. The objections to this arrangement are apparent. The true "wet-bulb" temperature condition exists only at the surface of the wetted wick. This temperature must be transferred by thermal conduction through the wet cloth, through the bulb walls and thence distributed through the volume of gas, liquid or other material filling the bulb. Also, practically, the bulb cannot be considered a thermally isolated body, heat is being conducted longitudinally along the bulb from outside supports. As a result, true "wet-bulb" readings are not generally obtained, and response to varying conditions of humidity are unduly slow. Moreover, in practice, it is commonly found that wicks must be changed frequently due to the accumulation thereon of dirt from the air stream and residue from the water; also that the range of usefulness of this method is limited by the ability of the cloth to supply by capillarity the quantities of water required to maintain the proper degree of wetness for any range of conditions of humidity and dry bulb temperature. Furthermore, the presence of an open reservoir of water is not convenient, desirable or practicable, particularly in closed ducts or pipes. In the second method a porous ceramic tube is utilized in which the thermometer bulb may be permanently enclosed, providing an annular space between the tube and bulb to which water may be admitted. Water continuously seeps through pores of the ceramic tube and the rate of flow may be adjusted by suitable pressure so that the requirement for keeping the outer surface constantly and completely wet is fulfilled. Heretofore these ceramic tubes or sleeves have been made of considerable thickness of wall, of the order of $\frac{1}{16}$" and more. Hence, though a considerable increase is realized in the range of temperature and humidity conditions which can be measured by this method, as in the former case, an excessive temperature gradient is still present from the surface of the ceramic material to the gas or fluid in the bulb.

It is an object of the present invention to provide, for the purposes of hygrometry, a "wet bulb" which shall have all the advantages accruing to the second of the abovementioned methods of maintaining a suitable film of moisture for evaporation from the surface of the ceramic tube, and shall also be characterized by rapid transmission of the surface temperature to the sensitive filling fluid.

It is a further object to provide a thermometer bulb assembly of the above class, in which heat conduction from outside sources, such as supports, etc., shall be reduced to a minimum.

In carrying out the purposes of the invention, it is proposed to provide a heat sensitive bulb in the form of a helically wound coil of thin-walled, small-diameter, metallic tubing confined within a porous tube, the free space within said tube being closely filled with granular or porous material of high thermal conductivity, such, for example, as copper chips or filings. A connection is provided to the interior of the tube whereby there may be admitted to said porous tube a continuous supply of water to saturate the same and seep through its walls, maintaining on the surface thereof a suitable film of moisture. It is further proposed to distribute the coiled portion of the metallic tubing within the enclosing tube in such a manner that there shall be a substantially insensitive section adjacent the support of said ceramic tube, whereby the effects of conduction of heat from the bulb assembly to supporting bodies will be reduced to a minimum; and a portion of the filling material may, also, to this end be replaced by a short section of porous, thermally non-conducting material such as fine glass-wool, or powdered magnesium oxide to serve as a thermal barrier against temperature gradients originating at the supports.

The nature of the invention, however, will best be understood when described in connection with the accompanying drawings, in which.

Figure 2:
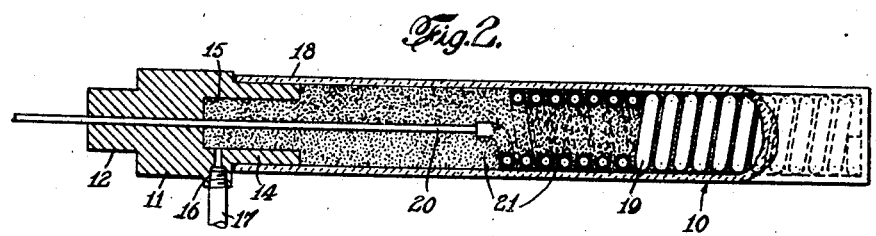
Fig. 2 is an elevation, partly in longitudinal section, of a bulb assembly embodying the principles of the invention.

Referring now to the drawings, 10 designates a bulb assembly embodying the principles of the invention and includes a metallic mounting member 11 for the same attached thereto at one end, said member 11 having a reduced portion 12 adapted for clamping the bulb assembly 10 as a whole in a suitable mounting bracket 13, Fig. 2. The opposite end of the mounting member is also reduced as at 14 having a smooth exterior cylindrical surface. Substantially within the portion 14 is a recess 15 communicating with a tapped opening 16 extending radially through the said member and into which opening 16 there may be inserted a small pipe or conduit 17 to admit fluid to said recess.

Fitted over the reduced portion 14 is a thin-walled porous tube or container 18 formed of unglazed porcelain or "alundum" or porous sintered metal or the like, its end at the extremity remote from the mounting member 11 being closed, while its opposite end fits over the reduced portion 14 of said member. The joint between the porous tube 18 and the said portion 14 is made fluid-tight by means of a small quantity of a suitable cement interposed between said parts.

Contained within the porous tube 18 and substantially restricted to the half of the length of said tube remote from the mounting member 11, is a helical coil 19 of small diameter metallic tubing (approx. 1/8" diam.) connected at its end nearest the mounting member to a capillary tube 20 which extends through that portion of the porous tube 18 not occupied by said coil 19. The capillary tube 20 extends also through the mounting member 11 into which it is suitably sealed to make a fluid-tight joint, and extends then beyond said mounting member for connection to a fluid-pressure-responsive member presently to be described. The helical coil 19 is sealed at its far end and is formed in such a manner that when inserted within the porous tube 18 it will by its own resiliency expand to a condition of intimate thermal contact with the interior walls of said tube.

Figure 5:
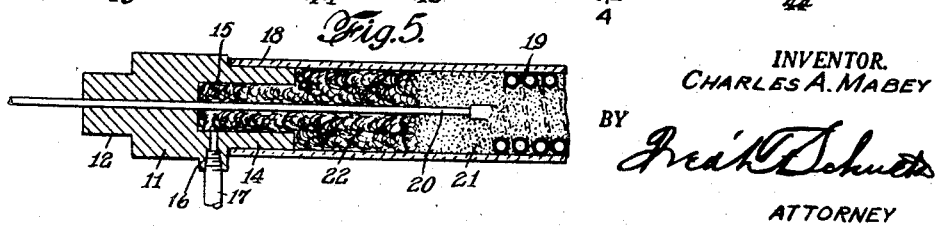
Fig. 5 is a fragmentary longitudinal section of the outer end of the bulb and illustrates a modification.

The space within the porous tube 18 not occupied by the coiled tube 19 and all the interstices within the coil are filled by a mass 21 of tightly packed granular substance not subject to corrosion by water, and preferably of high thermal conductivity. Copper chips or filings have been found to be especially effective for this purpose. Or, as indicated in Fig. 5, a short section at the mounting member end of the said tube 18 may be replaced by porous, thermally non-conductive material 22, such as fine glass-wool or magnesium oxide, to serve as a thermal barrier against temperature gradients originating at the supports for member 11.

Figure 1:
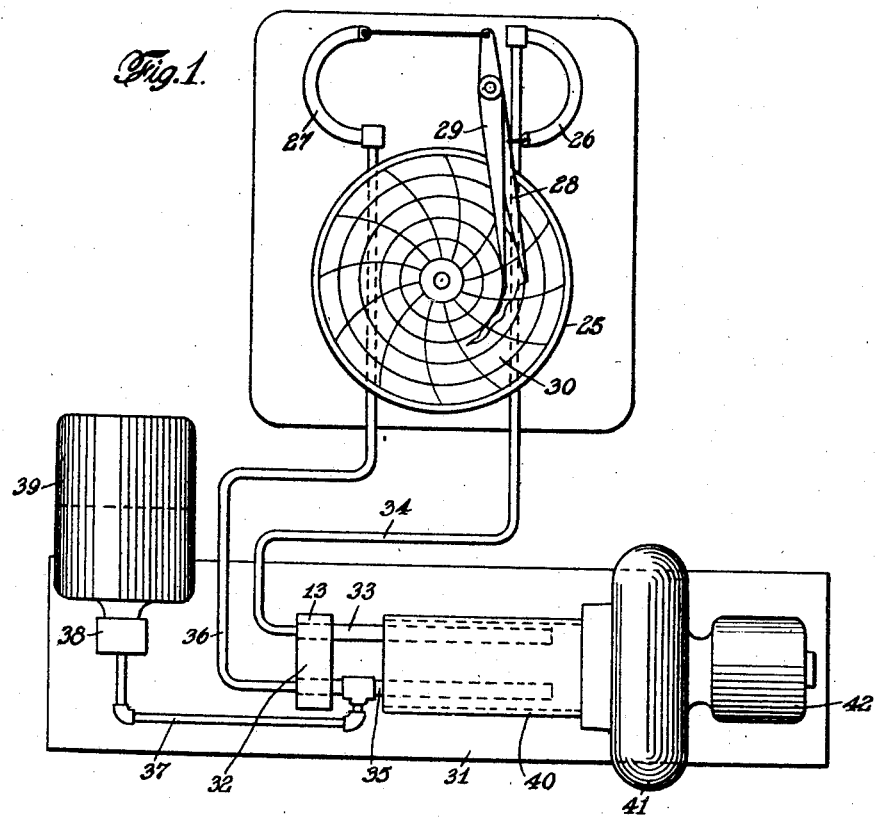
Fig. 1 is a diagrammatic representation of a hygrometer adapted to use with the novel type of wet bulb assembly.

The method of utilizing a bulb of the nature hereinbefore described is illustrated in Fig. 1 of the drawings wherein 25 designates a recording wet-and-dry-bulb hygrometer of the conventional type, involving no novel features other than the utilization, in the case of the wet bulb portion, of the novel bulb assembly to which the present invention is directed. The hygrometer 25 comprises two similar fluid-pressure-responsive elements, or Bourdon tubes 26 and 27 securely mounted within the instrument and connected by suitable linkages to pen arms 28 and 29 respectively, adapted to provide on a common set of ordinates on a movable chart 30 a record representative of deflections of said pressure-responsive elements. The chart 30, being driven at a constant speed by suitable timing mechanism, not shown, there is provided a permanent graphic record of the deflections of said pen arms—all of which is well understood in the art and forms no particular part of the present invention.

The bulb portions of the hygrometer are mounted upon a base or panel 31 by means of a bracket 32 which carries a thermometer bulb 33 of conventional design, comprising a sealed metallic chamber containing an expansible fluid adapted to change its volume in response to variations of the temperature to which said bulb is exposed. The bulb 33 is connected to the pressure-responsive element 26 in the recording instrument by means of a capillary tube 34. A bulb assembly 35 similar to that shown in Fig. 2 is also mounted in the bracket 32 in close proximity to the bulb 33, and has its interior portion filled with a suitable expansible fluid and connected by means of the capillary tube 36 to the pressure-responsive element 27 in the recording instrument. The water supply pipe 37 is connected to a suitably disposed reservoir 38 in which may be placed an inverted bottle or similar container 39, more or less filled with water, and adapted to maintain upon the pipe 37, and therefore within the interior of the porous tube of the wet-bulb assembly, a slight static pressure. The porous tube and the granular material contained therein will thus tend to become saturated with water; and, by proper adjustment of the level of the reservoir 38 with respect to said tube, there will be maintained upon the outer surface of the porous tube a film of moisture, whereby, according to the principles hereinbefore set forth, the pressure of the expansible fluid within the coiled tube will become a measure of the "wet-bulb-temperature" of the atmosphere to which the porous tube is exposed.

The bulb assembly 35 and the bulb 33 are surrounded by a relatively large tubular tunnel 40 attached to the intake of a small blower 41 adapted to be driven by a suitable motor 42, whereby there will be maintained a current of air around both of the said bulbs, thus causing them to be exposed to an atmosphere representative of that whose absolute humidity it is desired to determine. The pens 28 and 29 will thus provide on the chart 30 simultaneous records of the dry-bulb temperature and the wet-bulb temperature respectively; and these records may be combined as hereinbefore set forth to give a measure of the desired value of relative humidity.

Figure 3:
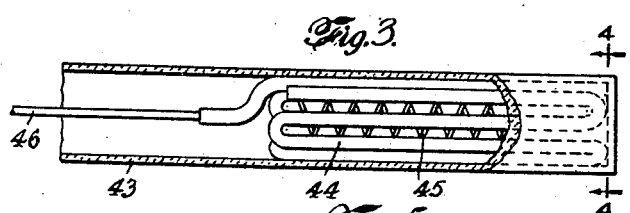
Fig. 3 is a fragmentary longitudinal section, partly in elevation, of an alternative form of the bulb assembly.
Figure 4:
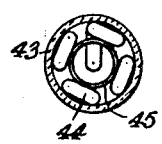
Fig. 4 is a transverse section thereof taken on the line 4—4, Fig. 3, looking in the direction of the arrows.

In Figs. 3 and 4 is shown a form of bulb assembly which may be used alternatively to that shown in Fig. 2 for carrying out the purpose of the invention. As indicated, a porous tube 43 of ceramic material or the like, or of sintered metal identical in all respects with the corresponding tube 18 shown in Fig. 2 and similarly to be mounted on a fitting (not shown), has positioned therein, and toward the extremity thereof remote from the mounting, a convoluted tubular metal member affording a chamber 44. This member is coiled in the present instance lengthwise with axially disposed parallel portions to form a structure of substantially cylindrical exterior conformation adapted to fit snugly within the porous tube 43, and it may be so proportioned in its coiling as to tend to expand of its own resiliency into intimate thermal contact with the interior wall of the porous tube 43. Or, if desired, said contact may be made more positive by placing within the structure formed by said convoluted tubular member an independent helically coiled spring 45 adapted to exert an outward radial pressure on the axially disposed portions of said member, whereby to maintain them in engagement with the interior surface of the porous tube 43.

Connected to the chamber formed by the tubular member is a capillary tube 46 adapted for connection to a pressure sensitive member as the Bourdon tube 27, Fig. 1; and the porous tube 43 and all interstices in the enclosed assembly may be tightly filled with a mass (not shown) of granular material which may be of high thermal conductivity, or partly of such material and an end section of thermally non-conductive material; and liquid is introduced thereto, all in a manner identical to that described in connection with the tube assembly shown in Fig. 2. The connection and the utilization of the form of bulb assembly shown in Figs. 3 and 4 are identical with that shown in Fig. 2; and choice between the two forms is solely a matter of efficiency and mechanical expediency.

It will be obvious that, with either of the bulb assemblies shown, the intimate thermal contact between the coiled tubing and the inside wall of the porous tube, together with the filling of the interior space surrounding the coil in whole or in part with a mass of thermally conducting material, will facilitate heat transfer between the exterior wall of the porous tube and the expansive fluid of the temperature sensitive bulb, thus eliminating much of the response delay which characterizes "wet-bulbs" of the conventional types.

It will further be apparent that, by restricting the sensitive portion of the bulb to that part of the assembly which is remote from the mechanical mounting, the effects of heat transfer between said mounting and bulb are minimized, thus tending to make the measured temperature correspond more closely to that of the atmosphere whose characteristics are under determination.

I claim:

1. A temperature-sensitive bulb for hygrometric measurement of an atmosphere, comprising a porous container adapted to have its exterior surface exposed to said atmosphere, a connection to the interior of the container for supplying thereto a vaporizable liquid to saturate the walls of the same, and an extended convoluted tube located within the container secured at one end thereto and providing a tubular chamber containing an expansible fluid, said tube being expansible for thermal contact with the inner surface of the container and having a portion extending through the wall of the container for connection to a fluid-pressure-measuring element, and granular material of high thermal conductivity retained in the container about the convoluted portion of said tube.

2. The temperature-sensitive bulb of claim 1, wherein the tube is coiled lengthwise of the porous container.

3. The temperature-sensitive bulb of claim 1, wherein means are provided within the porous container for maintaining the convoluted tube in thermal contact with the interior walls of the porous container.

4. The temperature-sensitive bulb of claim 1, wherein resilient means are provided within the convoluted tube for maintaining it in thermal contact with the interior walls of the porous container.

5. The temperature-sensitive bulb of claim 1, wherein the tube is coiled lengthwise of the porous container and a helically coiled spring is located therein for maintaining the tube in thermal contact with the walls of said container.

6. The temperature-sensitive bulb of claim 1, wherein metal particles are retained in the porous container and fill the interstices between the convolutions of the convoluted tube.

7. The temperature-sensitive bulb of claim 1, wherein the porous container is extended and adapted for support at one end, and the convoluted tube occupies only that portion of the porous container remote from the supporting end with its extension passing through said supporting end.

8. A temperature-sensitive bulb for hygroscopic measurement of an atmosphere, comprising a thin, porous bulb, a convoluted temperature-sensitive tube closely fitted therein, and thermally conductive, porous material retained in the bulb about the convoluted portion of the tube, and porous thermally non-conductive material retained in the bulb at the outlet end thereof.

CHARLES A. MABEY.

REFERENCES CITED

The following references are of record in the file of this patent:

UNITED STATES PATENTS

| Number | Name | Date |
|---|---|---|
| 1,144,649 | Fournier | June 29, 1915 |
| 1,233,480 | Jacobus | July 17, 1917 |
| 1,484,129 | Hermann | Feb. 19, 1924 |
| 1,586,351 | Bristol | May 25, 1926 |
| 2,135,078 | Hubbard | Nov. 1, 1938 |
| 2,336,092 | Grooms | Dec. 7, 1943 |
| 2,243,355 | Olson | May 27, 1941 |

FOREIGN PATENTS

| Number | Country | Date |
|---|---|---|
| 600,471 | France | Nov. 9, 1925 |
| 522,704 | Great Britain | June 25, 1940 |